Jan. 27, 1970  D. M. BLACKBURN  3,491,626
TURRET LATHES
Filed Sept. 21, 1967
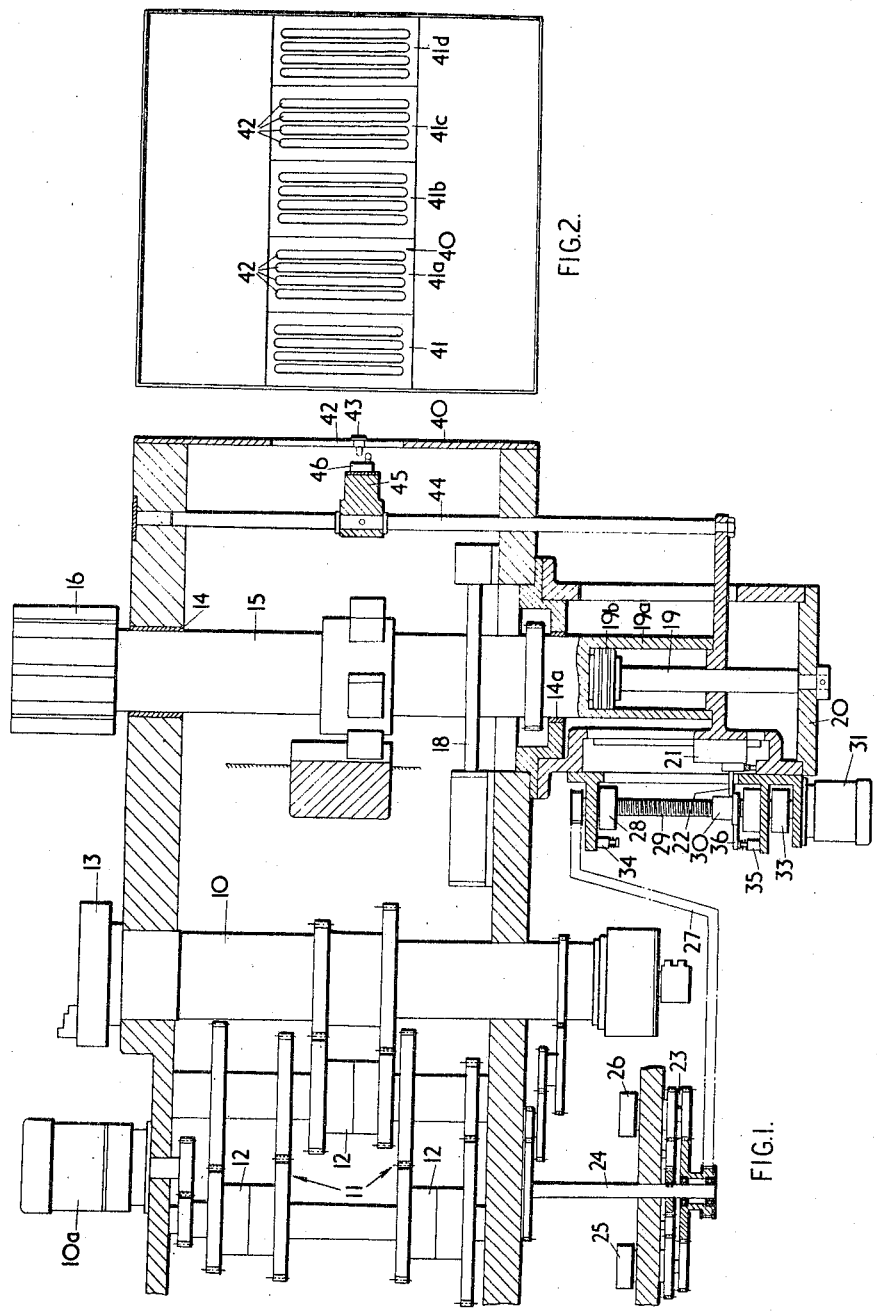
Inventor
Donald MacPherson Blackburn
By Hancock Dowsing Scholl
Attorneys

United States Patent Office 3,491,626
Patented Jan. 27, 1970

3,491,626
TURRET LATHES
Donald Macpherson Blackburn, Johnstone, Scotland, assignor to Wickman Lang Limited, Johnstone, Scotland
Filed Sept. 21, 1967, Ser. No. 669,495
Int. Cl. B23d 3/28
U.S. Cl. 82—21                               1 Claim

ABSTRACT OF THE DISCLOSURE

A turret lathe having means to control automatically the cycle of operations of each tool or group of tools of a turret lathe comprising a hydraulic piston and cylinder to effect the traverse of the turret, a stylus controlled servo-valve movable in unison with the traverse of the turret and controlling the supply of hydraulic pressure fluid to the cylinder and means driven through gearing by the lathe spindle by which the stylus is controlled so that its rate of travel will always bear a constant predetermined ratio to the speed of rotation of the lathe spindle.

---

This invention has reference to turret lathes.

The turret of such lathes is provided with a plurality of circumferentially arranged faces on each of which a toolholder is, or can be, fitted the tools in the various toolholders being suitable for the required machining on the workpiece held by the chuck which is rotated by the lathe spindle. The turret is rotated step by step to present the tool, or tools, of each tool-holder in turn to the workpiece and after each step the turret is given a transverse cycle consisting of a fast approach stroke, a slow feed stroke followed by a quick return stroke. The length of the fast approach stroke and the rate of feed of the slow feed stroke may both vary for each tool or group of tools carried by each tool-holder and the present invention has for its primary object to provide improved means to control automatically the aforesaid cycle for each tool or group of tools.

According to the present invention a turret lathe is provided with a hydraulic cylinder and piston assembly to effect the traverse of the turret, a stylus controlled servo-valve movable in unison with the traverse of the turret and controlling the supply of hydraulic pressure to the cylinder, transmission means controlling the stylus, and thereby the traverse of the turret, comprising a feed gear box having a range of gear ratios suitable for the various speed rates of the turret, the driving member thereof being driven by the lathe spindle and the driven member actuating the stylus so that its rate of travel will always bear a constant predetermined ratio to the speed of rotation of the lathe spindle and pre-set means by which the gear box is operated automatically to control the desired length of the approach stroke and the rate of feed stroke of the tool or group of tools on each face of the turret.

A preferred embodiment of the invention will now be described with reference to the accompanying drawings wherein:

FIGURE 1 shows diagrammatically a sectional plan view of one construction of turret lathe in accordance with the invention; and FIGURE 2 shows the control panels of the lathe shown in FIGURE 1.

In the turret lathe shown in the accompanying drawings the lathe spindle 10 is driven by a motor 10a through a gear box 11, the gears having electro-hydraulically controlled clutches 12 by which the speed ratio of the gear train to the lathe spindle 10 can be varied. The gear may give eight speed ratios. for example. Such gear box is conventional in turret lathes and is not described.

To the lathe spindle is secured the chuck 13 which carries the workpiece, not shown.

Mounted in bearings 14 and 14a and extending parallel to the lathe spindle is the turret spindle 15 which carries the turret 16. The turret has a number of circumferentially arranged faces, there may be for example five faces, and each face is provided with dovetail guides or is otherwise adapted to receive a tool-holder. Each tool-holder may carry one or more tools to operate on the workpiece held in the chuck 13 and rotated by the lathe spindle 10. The turret is rotated step by step by conventional turret indexing mechanism 18 to index the tool or tools of each tool-holder in turn so that it, or they, is, or are, in a position to operate on the workpiece during the feed stroke of the turret.

The end of the turret spindle remote from the turret constitutes a hollow cylinder 19a in which is housed a piston 19b having a piston rod 19 which is held against axial displacement by means of a fixture 20. A stylus controlled servo-valve 21 is provided to admit fluid under pressure into the cylinder 19a to act on either face of the piston and thereby traverse the turret spindle and the turret, the rate and direction of traverse being governed by the opening and closing of the servo-valve. This means of traversing the turret spindle is of a conventional nature.

The operation of the servo-valve, which is traversed with the turret spindle, is controlled by means of a stylus 22 which is traversed at predetermined speeds through a variable speed box 23. The variable gear box 23 is driven from the lathe spindle 10 through a gear train to an input shaft 24 which in turn drives the output gear through a series of gear trains of different ratios which are selected by electro-magnetically controlled clutches two of which are shown and designated 25 and 26.

The output from the variable gear box 23 is through a belt 27, or a chain or a train of gears to an electro-magnetically controlled clutch 28 and through the clutch to a lead screw 29 screwed through a nut 30 which is arranged to co-operate with the stylus 22 which is pressure biased in one direction.

The lead screw 29 can also be driven by a constantly running motor 31 through an electro-magnetically controlled clutch 33. The said clutches 28 and 33 are controlled by the closing of two limit switches 34 and 35 which are alternately closed by a finger 36 carried by the nut 30.

The co-operation of the finger with the limit switches determines the limit of travel of the nut and the travel of the turret.

The lathe is provided with a control panel 40, see FIGURE 2. This panel is divided into sections, one for each face of the turret. As the turret shown in the drawings has five faces the panel has five sections which are designated 41, 41a, 41b, 41c and 41d. Each section has four parallel slots 42 and in each slot is a button 43 adjustable to any position in the slot. The button in the first slot determines the point where there has to be a change in the speed of the lathe spindle, the button in the next slot determines the first and second feed change point, the button in the third slot determines the length of the quick traverse in one direction, and the button in the next slot determines the quick traverse in the other direction.

Traversed in unison with the turret are two spindles 44, only one being shown, which carry therebetween a cross member 45 and on the cross member are twenty switches 46 assuming the turret has five faces. During any cycle of operations the four buttons of any section of the panels will close four of said switches in accordance with the positioning of the buttons.

In setting the lathe so that the traverse of the turret is suitable for the machining to be done by the tools of the respective turret faces it is necessary to position the four buttons 43 in each section in the control panel in order to meet the requirements.

When the lathe is set in operation the lathe spindle 10 is driven by the motor 10a at a preselected speed determined by energising the appropriate clutch 12 by the control panel.

The lathe spindle through the gear box 23 and the energising of the appropriate clutch associated therewith and through the clutch 28 drives the feed screw 29 with the result that the nut 30 travels along the feed screw at a rate depending on the preselected gear ratio of the gear box 23. The nut in turn imparts a movement to the stylus 22 so that the servo-valve 21 is so actuated that pressure fluid is admitted to the cylinder 19a to impart the quick initial feed to the turret. At the same time the cross head 45 is traversed in unison with the turret.

At a predetermined point in this movement of the turret a switch 46 is actuated by a button 43 to change the gear ratio of gear box 23 so that a predetermined slower feed is imparted to the nut and to the stylus so that the servo-valve now restricts the flow of pressure fluid to the cylinder and this in turn results in a slower feed stroke of the turret.

At the end of the feed stroke switch 34 is actuated to de-energize clutch 28 whereupon the lead screw is rotated in the reverse direction by the motor 31 which now drives through clutch 33 to effect a quick return of the nut, the stylus then moving to effect a quick return of the turret. When the latter movement is completed clutch 33 is de-energized by the appropriate button and switch.

Further at the end of the travel of the turret a sequence switch, not shown, is closed to operate the turret change mechanisms whereby the turret is given a partial rotary movement so that the tool, or tools, carried by the next face is, or are, persented to the workpiece.

The foregoing cycle of operations is now repeated the timing thereof being now predetermined by the buttons of the second section of the control panel. Thereafter the turret is given a patrial rotation and the tools of the other faces are brought into operation in like manner.

The said switches operated by the buttons are grouped in five banks, there being one bank for each turret face.

At any time only one of the banks is live, that is the bank which is controlling the lathe when one face is presented to the workpiece.

At the beginning or end of the travel of the turret said sequence switch serves to make live the appropriate switches 46 for the next face to be presented to the workpiece the other switches being thereby rendered dead.

When the turret is being fed towards the workpiece its rate of feed is controlled by the operation of the stylus 22 which in turn is actuated by the nut 30. The traverse of the nut is effected through gearing driven by the lathe spindle. Consequently the feed of the turret is such that its rate of travel will always bear a predetermined ratio to the speed of rotation of the lathe spindle.

What I claim is:

1. A turret lathe provided with an hydraulic cylinder and piston assembly to effect the transverse of the turret, a stylus controlled servo-valve movable in unison with the traverse of the turret and controlling the supply of hydraulic pressure to the cylinder, transmission means controlling the stylus, and thereby the transverse of the turret, comprising a feed gear box having a range of gear ratios suitable for the various speed rates of the turret, the driving member thereof being driven by the lathe spindle and the driven member actuating the stylus so that its rate of travel will always bear a constant predetermined ratio to the speed of rotation of the lathe spindle and pre-set means by which the gear box is operated automatically to control the desired length of the approach stroke and the rate of feed stroke of the tool or group of tools on each face of the turret.

References Cited

UNITED STATES PATENTS

| | | | |
|---|---|---|---|
| 2,601,157 | 6/1952 | Le Lan | 82—21.1 XR |
| 2,796,793 | 6/1957 | Addison et al. | 29—64 XR |
| 2,934,812 | 5/1960 | Allen. | |
| 3,075,277 | 1/1963 | Ciejka et al. | 29—42 |

LEONIDAS VLACHOS, Primary Examiner

U.S. Cl. X.R.

82—14